(12) United States Patent
Asano et al.

(10) Patent No.: US 6,445,547 B1
(45) Date of Patent: Sep. 3, 2002

(54) MAGNETIC DISC DEVICE HAVING HEAD CONTROL MECHANISM CAPABLE OF EFFECTING HEAD CONTACT DURING HIGH SPEED MEDIUM ROTATION

(75) Inventors: Isao Asano, Fukushima-ken (JP); Kouzou Onodera, Fukushima-ken (JP)

(73) Assignees: Alps Electric Co., Ltd., Tokyo (JP); Sony Corporation, Tokyo (JP)

( * ) Notice: Subject to any disclaimer, the term of this patent is extended or adjusted under 35 U.S.C. 154(b) by 0 days.

(21) Appl. No.: 09/494,672

(22) Filed: Jan. 31, 2000

(30) Foreign Application Priority Data

Feb. 3, 1999 (JP) ............................................. 11-025975

(51) Int. Cl.⁷ ............................................. G11B 21/02
(52) U.S. Cl. ................... 360/246.1; 360/246.8
(58) Field of Search ............................ 360/246.1, 246.2, 360/246.3, 246.6, 246.7, 246.8, 75, 256.2, 256.3, 254.8

(56) References Cited

U.S. PATENT DOCUMENTS

| | | | |
|---|---|---|---|
| 4,942,484 A | | 7/1990 | Nigam |
| 5,095,395 A | * | 3/1992 | Wakatsuki ................ 360/256.3 |
| 5,446,606 A | * | 8/1995 | Brunner et al. ................ 360/75 |
| 5,644,451 A | * | 7/1997 | Chan et al. ............... 360/254.8 |
| 5,734,527 A | * | 3/1998 | Reinhart ................... 360/256.2 |
| 5,808,825 A | * | 9/1998 | Okamura ..................... 360/75 |
| 5,912,791 A | * | 6/1999 | Sundaram et al. .......... 360/135 |
| 6,018,428 A | * | 1/2000 | Okamura ..................... 360/25 |

\* cited by examiner

*Primary Examiner*—David L. Ometz
(74) *Attorney, Agent, or Firm*—Brinks Hofer Gilson & Lione

(57) ABSTRACT

When loading an upper head, it is brought into contact with a disc, with a lower head being in contact with the disc. In this process, the entire surface of the upper head which slides on the disc and in which gaps are provided is brought into contact with the disc at a position off the data zone. Further, the upper head is provided with a supported member, and a support member supporting the supported member, whereby the upper head is supported before coming into contact with the disc, and the upper head is gradually brought close to the disc to effect contact.

3 Claims, 3 Drawing Sheets

MAGNETIC DISC DEVICE HAVING HEAD CONTROL MECHANISM CAPABLE OF EFFECTING HEAD CONTACT DURING HIGH SPEED MEDIUM ROTATION

BACKGROUND OF THE INVENTION

1. Field of the Invention

The present invention relates to a magnetic disc device for use in writing and reading information to and from a magnetic disc medium and, in particular, to a magnetic head device having a head control mechanism for effecting head contact during high speed medium rotation.

2. Description of the Related Art

Recently, a magnetic disc device has been developed which is capable of recording and reproducing data on and from both a large capacity medium and a low capacity (downward compatibility) medium. In such a device, the heads are provided with a gap for large capacity and a gap for low capacity (downward compatibility), switching between the heads being appropriately effected.

FIG. 6 shows a disc D and heads 4 and 5 in a conventional magnetic disc device 20.

In the medium of this magnetic disc device 20, the disc D is accommodated in a hard case (not shown), and when the medium is inserted into the device, a shutter provided in the hard case is opened and the disc appears, and the heads enters through the shutter to come into contact with the surfaces of the disc D, making it possible to record and reproduce data.

As shown in FIG. 6, in this conventional magnetic disc device 20, the heads 4 and 5 are opposed to either surface of the disc D, and the heads 4 and 5 are movable in the radial direction of the disc D. In the head 4 on side 0 (the side on which the position of opposition to the disc D is determined), a gap 4b for downward compatibility is formed on the inner side of the disc D, and a gap 4a for large capacity is formed on the outer side thereof. In the head 5 on side 1 (the side on which the head makes a movement to and away from the disc D), a gap 5b for downward compatibility is formed on the outer side, and a gap 5a for large capacity is formed on the inner side.

When the medium is inserted to a predetermined position, the head 5 first comes into contact with the lower surface of the disc D, and then the disc D starts to rotate, and further, the head 4 comes into contact with the upper surface of the disc D. It is determined whether the inserted medium is a large capacity medium or a downward compatibility medium. In the case of a large capacity medium, the disc D rotates at high speed, and in the case of a downward compatibility medium, the disc D rotates at low speed.

The above-described conventional magnetic disc device has the following problems.

When the medium is inserted to reach a predetermined position, the head 5 first comes into contact with the lower surface of the disc D. After that, the disc D rotates, and further, the head 4 comes into direct contact with the data zone 6a of the disc D. When the medium inserted is one for downward compatibility, the disc D rotates at low speed when the head 4 comes into contact with the disc, and when the medium inserted is one for large capacity, the disc D rotates at higher speed.

In this way, when a medium for downward compatibility is inserted, the disc D rotates at low speed, so that there is little fear of damaging the disc D even when the heads 4 and 5 are brought into direct contact with the data zones 6a and 6b. However, when a medium for large capacity is inserted, the disc D rotates at high speed, so that when the head 4 is loaded onto the disc D in this condition, there is a fear that the data zone 6a will be damaged since the contact is effected directly in the data zone 6a. As a result, it is impossible to record and reproduce data, or the data recorded may be damaged.

It might be possible to adopt a means for rotating the disc D after the heads 4 and 5 are brought into contact with the disc D. However, when the rotation is started after the heads have been brought into contact with the disc D, the durability of the disc D is deteriorated. Further, the heads 4 and 5 are attracted by the disc D to thereby damage the disc D.

SUMMARY OF THE INVENTION

The present invention has been made with a view toward solving the above problems. It is an object of the present invention to provide a magnetic disc device capable of minimizing damage to the medium when head loading is effected.

According to the present invention, there is provided a magnetic disc device of the type which includes a medium having on both sides data zones deviating from each other, and heads which are opposed to the sides of the medium and whose head gaps are offset, the heads consisting of a first head whose position of medium opposition is fixed and a second head which is caused to move to and away from the medium, the magnetic device comprising a head control mechanism which causes a slide surface of the second head to come into contact with a portion deviating from the data zone, with the first head being in contact with the data zone.

In the above means, when, for example, the head is controlled on the inner side of the medium, when the medium is inserted into the magnetic disc device and reaches a predetermined position, the slide surface of the first head, that is, the head on the side of the data zone further offset to the inner side, comes into contact with the disc, and then the slide surface of the second head comes into contact with the disc. At this time, the slide surface of the second head comes into contact with a portion offset from the data zone. Thus, when the second head comes into contact with the disc, it is possible to prevent as much as possible the slide surface from damaging the disc. In particular, when the medium is large capacity type, the rotation is effected at higher speed to record and reproduce data than in the case of a medium for downward compatibility, so that the disc is more subject to damage. However, due to the above means, it is possible to prevent as much as possible the medium from being damaged even in the case of a large capacity type medium.

Further, the above-mentioned heads can form gaps in conformity with writing and reading to and from a small capacity medium and a large capacity medium.

For example, in this case, the gaps of the heads are offset, and in parallel with respect to the radial direction of the medium. When the first head has a downward compatibility gap on the head outer side and a large capacity gap on the head inner side, the second head has a large capacity gap on the head outer side and a downward compatibility gap on the head inner side.

Further, the head control mechanism comprises an arm which supports the second head and biases it in the direction of the medium, and a support member which supports the arm at a position where the second head is separated from the medium, and when the arm and the head move, the head is preferably separated from the support member and comes into contact with the medium.

For example, when the medium is inserted into the device by the above means, the second head is supported by the arm supporting the head and biased in the direction of the medium, the head being supported by the support member directly before the head comes into contact with the medium. Further, due to the movement of the arm, the head gradually moves in the direction of the medium, and the head, that is, the slide surface of the head comes into contact with the surface of the disc. As a result, the head is prevented from coming into contact with the medium abruptly and with larger force, thereby preventing as much as possible the medium from being damaged.

In this case, the configuration of the support member can be appropriately changed according to the configuration of the arm coming into contact with the support member. For example, it is possible to provide on the arm side a supported portion which is pin-like with respect to the arm width direction, and provide on the support member side a member supporting the supported portion. Or, it is possible to integrally provide at the forward end of the arm a small-piece-like supported portion and support it by the support member.

Further, the upper surface of the support member is formed by an inclined surface which is downwardly directed on the rear side with respect to the direction in which the arm advances, and the inclined surface is formed by a slope which is gentler on the upstream side than on the downstream side with respect to the rotating direction of the medium, and when the arm retreats, the head is preferably formed such that it is moved onto the medium in a position in which it is upwardly inclined on the upstream side.

Due to the above means, when the head comes into contact with the medium, the head is inclined, and the medium is prevented from being damaged as a result of the head coming into contact with the upstream side portion of the medium with respect to the medium rotating direction.

For example, when the pin-like supported portion is provided, it is possible to form the inclined surface of the support member such that the slope is gentler on the upstream side than on the downstream side with respect to the medium rotating direction. Or, when a small-piece-like supported portion is provided at the forward end on the arm side, the supported portion can be formed such that it is offset to the upstream side from the center of the head with respect to the medium rotating direction.

DESCRIPTION OF THE PREFERRED EMBODIMENT

Figure 1:
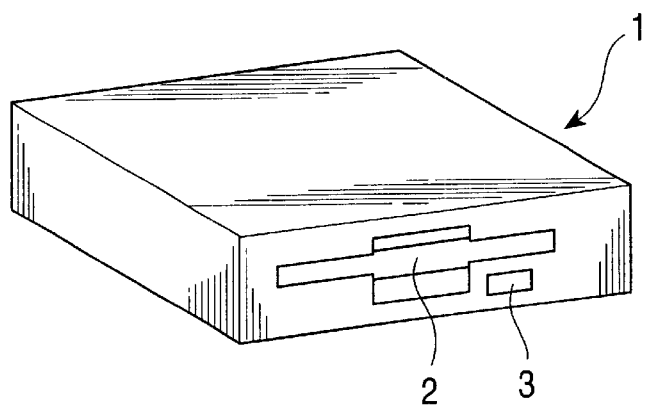
FIG. 1 is a perspective view showing an example of the outward appearance of the magnetic disc device.
Figure 2:
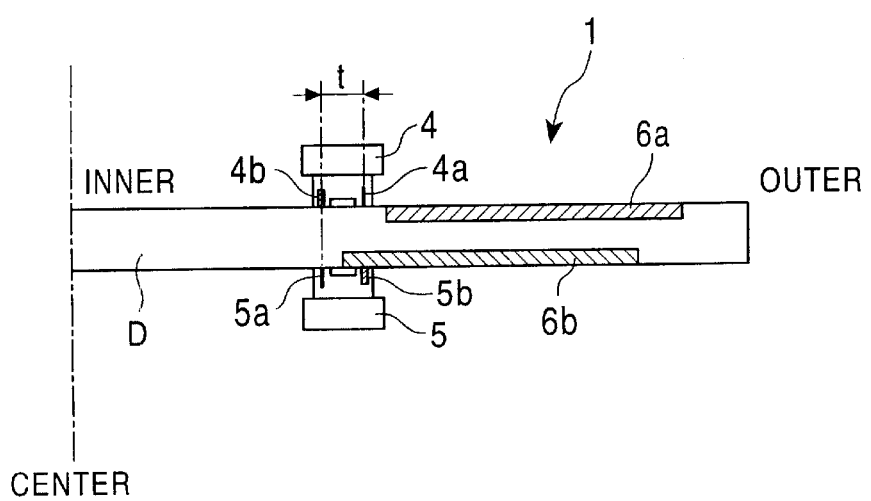
FIG. 2 is a schematic diagram showing the position relationship between the head and the disc when they come into contact with each other.
Figure 3:
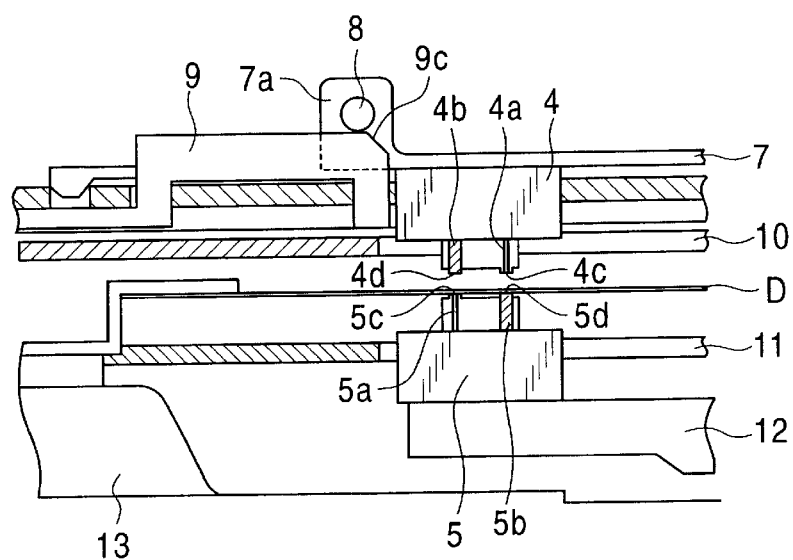
FIG. 3 is a schematic diagram illustrating the head operation.
Figure 4:
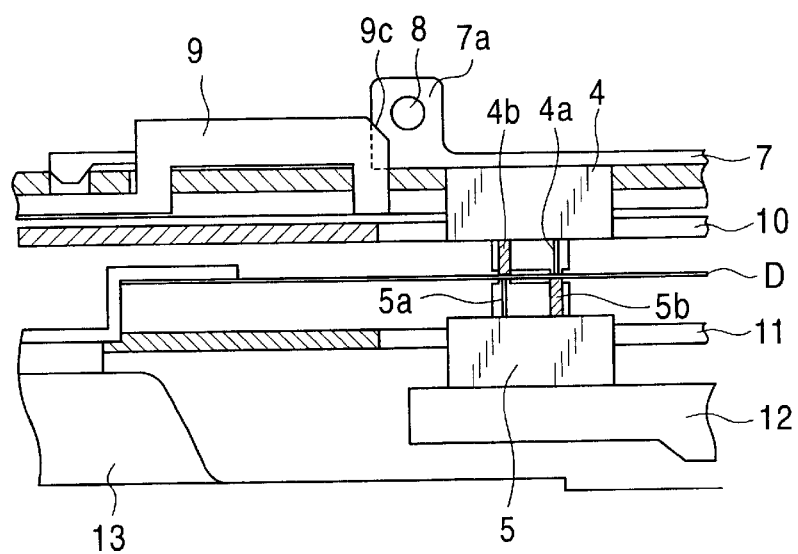
FIG. 4 is a schematic diagram illustrating the head operation.
Figure 5:
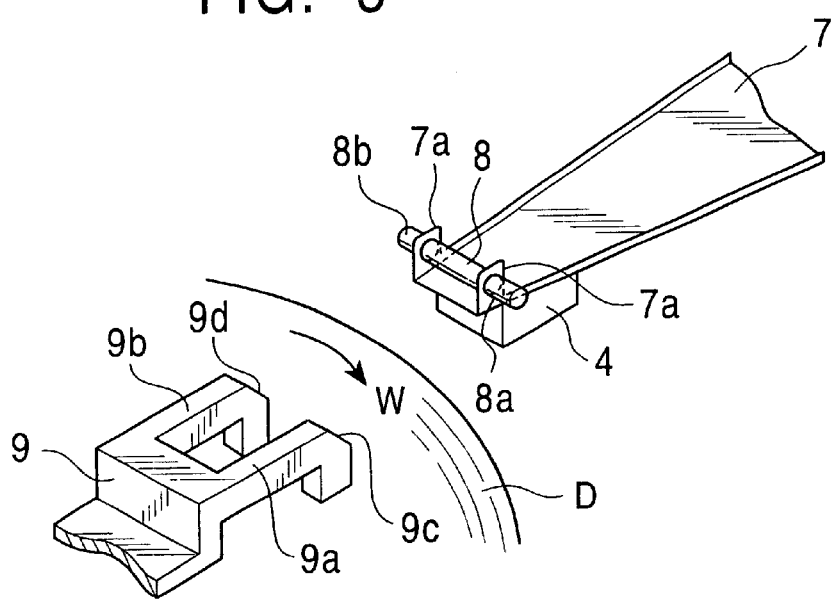
FIG. 5 is a perspective view showing an example of the configuration of the supported portion and the support member and the arrangement relationship of them and the disc.
Figure 6:
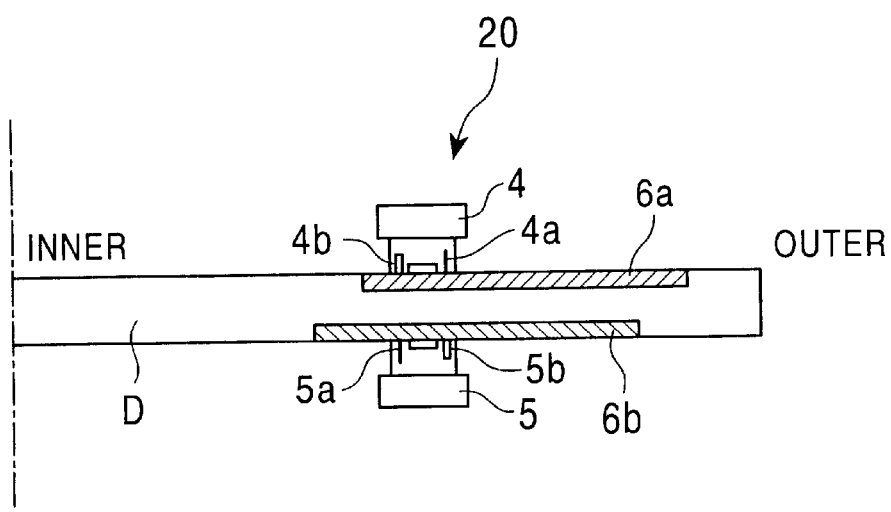
FIG. 6 is a schematic diagram illustrating a conventional magnetic disc device.

The magnetic disc device of the present invention will now be described with reference to FIGS. 1 through 5. FIG. 1 is a perspective view showing the outward appearance of a magnetic disc device; FIG. 2 is a plan view showing the initial state in which the disc is in contact with the heads; FIGS. 3 and 4 are diagrams illustrating the head operation; and FIG. 5 is a perspective view showing an example of the configuration of the supported portion and the support member.

As shown in FIG. 1, a magnetic disc device 1 according to the present invention is formed by using a rectangular box-like casing, and on the front surface thereof, there are formed an inlet 2 through which a disc (medium) is inserted, and an eject button 3 used when extracting the disc.

This magnetic disc device 1 can use a large capacity medium and a downward compatibility medium, which are accommodated in similar hard cases to enable data to be recorded and reproduced. The media accommodated in these hard cases are thin and flexible discs.

As shown in FIG. 2, the magnetic disc device 1 has heads 4 and 5 which are arranged on either side of the flexible disc D. The discs consist of a head 4 on a first side side 1 (the second head which is caused to move to and away from the disc D), and a head 5 on a second side side 0 (the first head whose position opposed to the disc D is fixed), the heads 4 and 5 being supported so as to be movable in the radial direction of the disc D. Further, as shown in the drawing, the disc D has on either side thereof data zones for recording and reproduction of data which are at different positions. The data zone 6a on the head 4 side is offset to the outer side as compared with the data zone 6b on the head 5 side.

The hard case accommodating the disc D is provided with a shutter (not shown). When they are formed, the data zones 6a and 6b are restricted by the position of the opening of the shutter.

Further, in the head 4 on the first side side 1, gaps 4a and 4b are provided in parallel in the radial direction of the disc D; the large capacity gap 4a is arranged on the outer side and the downward compatibility gap 4b is arranged on the inner side. Similarly, in the head 5 on the second side side 0, gaps 5a and 5b are arranged in parallel in the radial direction of the disc D; the downward compatibility gap 5b is arranged on the outer side, and the large capacity gap 5a is arranged on the inner side. As stated above, the large capacity gaps 4a and 5a and the downward compatibility gaps 4b and 5b are provided so as to be offset in the radial direction of the disc D (distance t).

Further, the surfaces of the heads 4 and 5 coming into contact with the disc D protrude, and the gaps 4a, 4b, 5a and 5b are formed in these protruding portions; the gaps 4a, 4b, 5a and 5b and the peripheral portions constitute slide surfaces to slide on the disc D, making it possible to record and reproduce information.

In the magnetic disc device 1, constructed as described above, when the disc D is inserted up to a predetermined position, the slide surface of the head 5 including the gaps 5a and 5b first comes into contact with the disc D. In this case, the contact is effected with a very low pressurizing force approximately the same as the weight of the disc D, and then the disc D starts to rotate. Then, the slide surface of the head 4 including the gaps 4a and 4b comes into contact with the disc D. In this case, the contact is effected, with the disc D being pressurized with the biasing force constantly acting on the head 4.

Further, due to the position and the size of the shutter, the head 5 cannot move the entire slide surface of the head 5 to the inner side beyond the data zone 6b, and the gap 5b comes into direct contact at a position where it is superimposed on the data zone 6b. Next, the head 4 is brought into contact with (lowered to) the disc D. At this time, the gaps 4a and 4b of the head 4 are lowered to a position off the data zone 6a and come into contact with the disc D.

In this case, the slide surface of the head 5 including the gap 5b for downward compatibility is superimposed on the data zone 6b and brought into contact therewith. However, since it is in contact with the disc D with a very low pressurizing force, there is little possibility of its damaging the disc D.

Further, the operation of the heads 4 and 5 of the magnetic disc device 1 of the present invention will be described with reference to FIGS. 3 and 4.

FIG. 3 shows the condition in which the disc D is inserted and the head 5 is in contact with the disc D.

Before the disc D is inserted, the head 4 is standby above a position where the disc D can be inserted. When the disc D is inserted and reaches a predetermined position, the shutter provided in the hard case is opened, and openings 10 and 11 are formed in the upper and lower surfaces of a part of the medium. Next, the hard case is lowered until the lower surface of the disc D is the same height as the head 5, and the head 5 provided on a carriage 12 enters through the opening 11, the slide surfaces 5c and 5d of the head 5 coming into contact with the disc D. In this case, the head 5 is in contact with the disc D with a very low pressurizing force approximately equal to the weight of the disc D. By driving the motor 13, the disc D is rotated and then the head 4 is loaded.

When the disc D is a disc for large capacity, it is detected that the disc is inserted by the host computer or on the drive side, and the motor 13 is rotated at high speed to rotate the disc at high speed. When the disc D is a disc for downward compatibility (small capacity), the motor 13 is rotated at low speed to rotate the disc at low speed. In this case, the gap 5b (or the gaps 5a and 5b) of the head 5 is brought into direct contact at a position where it is superimposed on the data zone 6b of the disc D.

The head 4 is not horizontally loaded with respect to the disc D but loaded in an inclined position.

That is, as shown in FIG. 3, the head 4 is mounted to the forward end of the arm 7. As shown in FIG. 5, the arm 7 consists of a plate-like suspension member, and by using a plate spring or the like for the base portion of the arm 7, a biasing force constantly acts such that the head 4 is biased in the direction of the disc D. Further, support members 7a having round through-holes protrude from either side of the forward end portion of the arm 7, and further, a cylindrical supported member 8 is provided such that it extends through the through-holes of the support members 7a. Further, the end portions of the supported member 8 protruded outwardly beyond the support members 7a.

In the disc device 1, there is provided a support member 9 which supports the supported member 8 in front of the arm 7. As shown in FIG. 5, the support member 9 has a forked configuration and includes horizontal leg portions 9a and 9b and downwardly inclined portions 9c and 9d formed at the corners at the forward ends of the leg portions 9a and 9b. The inclined portions 9c and 9d can support the protruding portions 8a and 8b of the supported member 8, and a predetermined gap is provided between the leg portions 9a and 9b so that the forward end portion of the arm 7 can pass.

After the rotation of the disc D is started, the head 4 comes into contact with the disc D. In the process, the supported member 8 hits against the support member 9, and the head 4 is supported at a position slightly separated from the disc D, the supported member 8 provided on the arm 7 being supported by the upper surfaces of the leg portions 9a and 9b. Further, when the arm 7 retreats, the supported member 8 (protruding portions 8a and 8b) slide on the slopes of the inclined portions 9c and 9d, and while it is doing so, the distance between the head 4 and the disc D is gradually reduced. Further, when the arm 7 retreats and there are no inclined portions 9c and 9d, the slide surfaces 4c and 4d of the head 4 come into contact with the disc D with the biasing force acting on the arm 7.

In this case, the head 5 moves horizontally while being opposed to the head 4 with the movement of the head 4 (the retraction of the arm 7), and when the head 4 comes into contact with the disc D, the heads 4 and 5 come into contact with the disc D so as to be opposed to each other.

In this case, at the initial stage, the slide surfaces 4c and 4d of the head 4 come into contact at positions off the data zone 6a of the disc D as shown in FIG. 2. Thus, no flaw is generated in the data zone 6a of the disc D.

Further, in the inclined portions 9c and 9d, the slope of the inclined portion 9d is gentler than that of the inclined portion 9c. That is, the slope of the inclined portion 9d formed on the upstream side with respect to the rotating direction W of the disc D is formed so as to be gentler than the slope of the inclined portion 9c, and when the protruding portions 8a and 8b of the supported member 8 are respectively supported by the inclined portions 9c and 9d, the height as measured from the disc D is higher on the inclined portions 9d side on the inclined portion 9c side. Due to this arrangement, before the head 4 comes into contact with the disc D, the slide surfaces 4c and 4d of the head 4 come into contact with the disc D in an inclined position such that the upstream side with respect to the rotating direction W of the disc D is upwardly directed. Thus, the disc D is prevented from being damaged by the slide portions 4c and 4d of the head 4 and, in particular, the upstream side corner portions of the slide portions 4c and 4d.

The magnetic disc device of the present invention is not restricted to the above-described embodiment; it is also possible on the outer side of the disc D. The head control in this case is performed as follows: reverse to the above-described embodiment, the head 4 side is first brought into contact and fixed in position, and then the head 5 is brought into contact at a position off the data zone 6b, whereby the same effect as described above can be achieved.

In the magnetic disc device of the present invention, when loading the head, the position at which the head is first brought into contact is controlled so as to be off the data zone formed on the medium, whereby it is possible to prevent as much as possible the medium from being damaged by the slide surface of the head.

In particular, the present invention proves effective when applied to a large capacity medium to and from which data is recorded and reproduced by rotating the medium at high speed.

Further, the head is brought into contact with the medium in an inclined position in which the upstream side thereof with respect to the medium rotating direction is upwardly directed, whereby it is possible to prevent the medium from being damaged by the corner portion of the head.

What is claimed is:

1. A magnetic disc device of the type which includes a medium having data zones on a top portion of the medium and data zones on a bottom portion of the medium, where the data zones on the top portion deviate from the data zones on the bottom portion of the medium, and a plurality of heads which are opposed to the medium and whose head gaps are offset, the plurality of heads consisting of a first head at which it is opposed to the medium at a predetermined position and a second head which is movable towards to and away from the medium, the magnetic disc device comprising a head control mechanism which causes a slide surface of the first head to be brought into contact with the data zones on the bottom portion of the medium by a first pressurizing force, and which causes a slide surface of the second head to be brought into contact with the medium at a position offset from the data zones on the top portion by a second pressurizing force that is higher than the first pressurizing force.

2. A magnetic disc device according to claim 1, wherein the plurality of heads each have gaps for writing and reading data to and from a small capacity medium and a large capacity medium.

3. A magnetic disc device according to claim 1, wherein the head control mechanism comprises an arm supporting the second head and biasing it toward the medium and a support member supporting the arm at a position at which the second head is separated from the medium, the second head departing from the support member and coming into contact with the medium when the arm and the second head retreat, wherein an upper surface of the support member is formed by inclined surfaces whose rear sides with respect to the direction in which the arm advances is downwardly directed, wherein a gap is formed between said rear sides so that a forward end portion of the arm can pass therebetween, and wherein the inclined surface of an upstream side of the support member with respect to a medium rotating direction is formed by a different slope than on a downstream side so that the second head moves onto the medium in an inclined position in which the upstream side thereof is upwardly directed when the arm retreats.

\* \* \* \* \*